March 6, 1962

D. F. SAURENMAN 3,023,508

SINGLE ARM BOREHOLE APPARATUS

Filed Sept. 30, 1958

INVENTOR.
DEAN F. SAURENMAN

BY
*Brumbaugh, Free, Graves & Donohue* his ATTORNEYS.

March 6, 1962  D. F. SAURENMAN  3,023,508
SINGLE ARM BOREHOLE APPARATUS
Filed Sept. 30, 1958  3 Sheets-Sheet 2
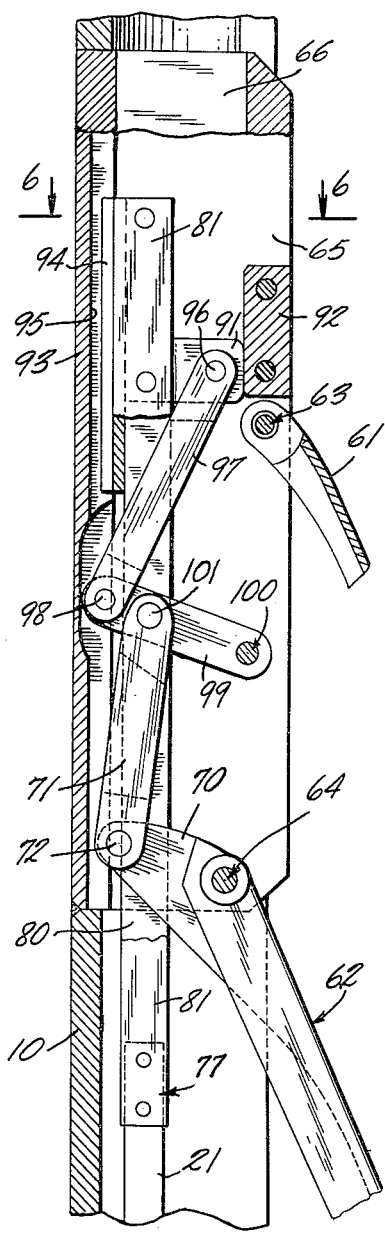
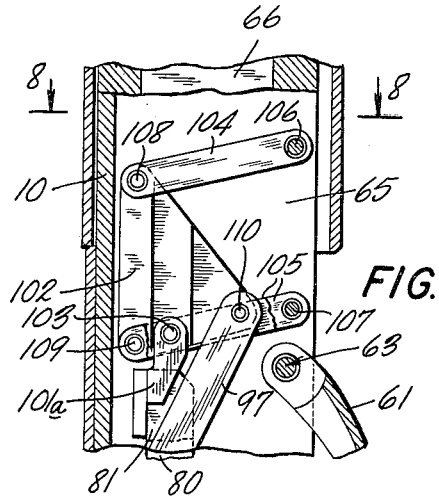
FIG. 7.
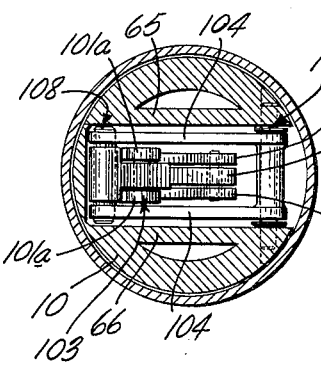
FIG. 8.
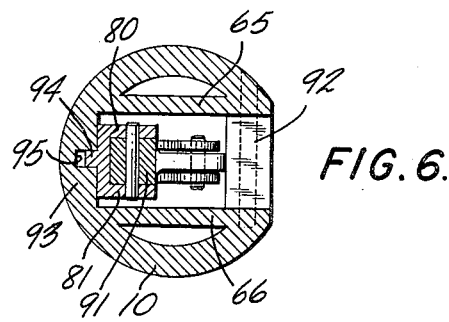
FIG. 6.
FIG. 5.
INVENTOR.
DEAN F. SAURENMAN
BY
Brumbaugh, Free, Graves & Donohue
his ATTORNEYS.

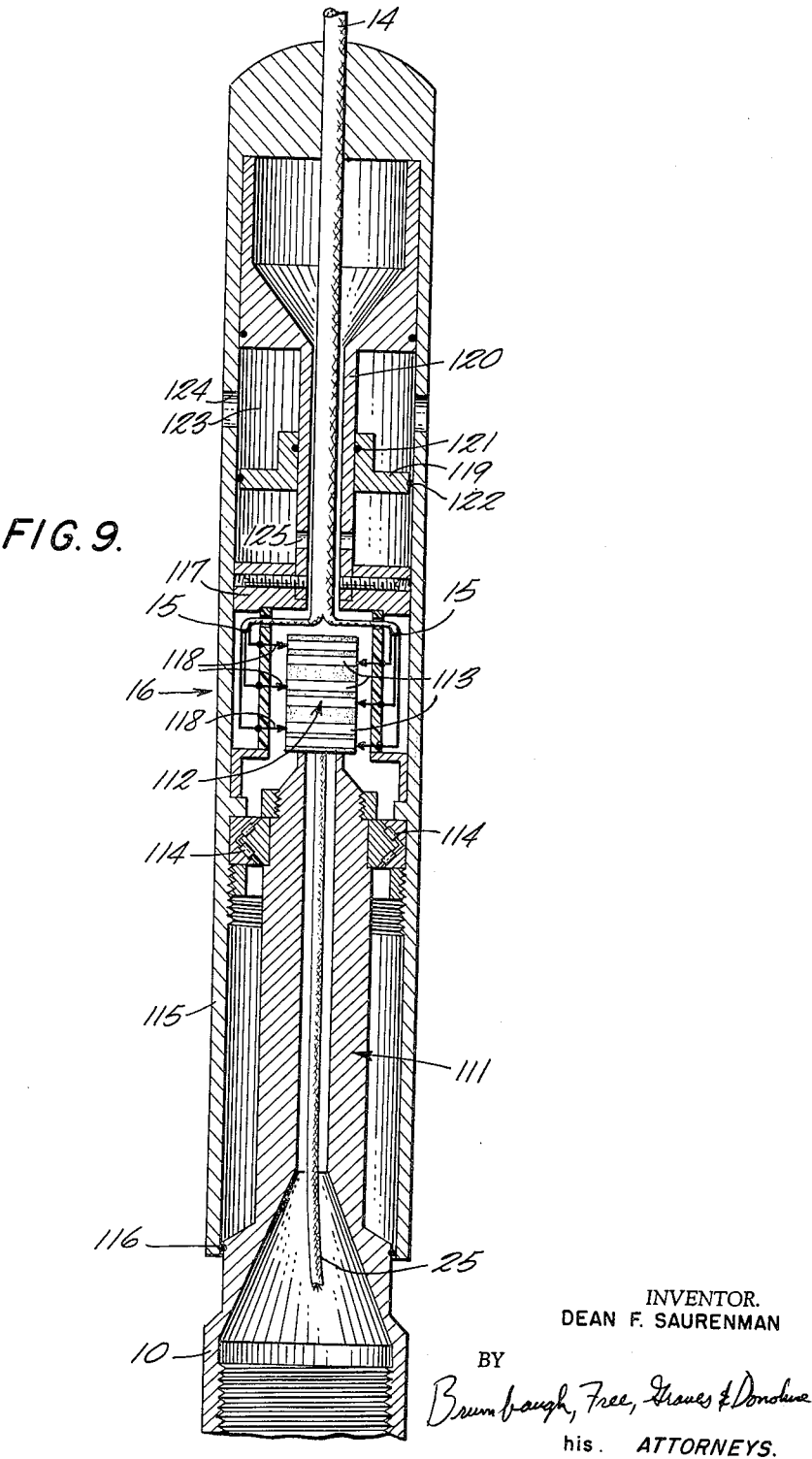

United States Patent Office 3,023,508
Patented Mar. 6, 1962

3,023,508
SINGLE ARM BOREHOLE APPARATUS
Dean F. Saurenman, Houston, Tex., assignor to Schlumberger Well Surveying Corporation, Houston, Tex., a corporation of Texas
Filed Sept. 30, 1958, Ser. No. 764,378
18 Claims. (Cl. 33—178)

This invention relates to borehole apparatus for making measurements in boreholes drilled into the earth, for example, and more particularly, to a new and improved borehole measuring apparatus especially adapted for use in boreholes drilled at an angle to the vertical.

In conventional borehole apparatus for use in vertical boreholes, it is customary to provide at least two extensible arms on the apparatus housing carrying pad members which are arranged to engage the wall of the borehole to determine the character of earth formations through which the borehole passes. These arms are usually retracted while the apparatus is lowered to the bottom of the borehole and extended to engage the side walls when the apparatus is raised through the borehole. In addition, they may be linked for simultaneous extension and retraction in the manner described in copending U.S. application of Saurenman and Lebourg, Serial No. 419,678, filed March 30, 1954, now Patent No. 2,876,413, and having the same assignee as the present application, for example, so that the borehole diameter can be measured. When apparatus of this type is used in slanted boreholes, however, the weight of the apparatus tends to pull the apparatus housing away from the center of the borehole thereby retracting the arms and producing an incorrect measurement of the borehole diameter. Furthermore, inasmuch as the measuring arms are pivotally mounted on the housing and the pad members pivot as the arms move outwardly, the torque resulting from the weight of the pads increases as the pads are extended, thereby reducing the pad extending force, causing poor pad contact and giving rise to incorrect diameter readings at large borehole diameters.

Accordingly, it is an object of this invention to provide apparatus especially adapted for making measurements in boreholes drilled at an angle to the vertical.

Another object of the invention is to provide borehole apparatus of the above type which is maintained in a predetermined angular alignment with respect to the vertical while a slanted borehole survey is being conducted.

A further object of the invention is to provide apparatus capable of precise diametral measurements in a slanted borehole.

Still another object of the invention is to provide borehole measuring apparatus exerting a constant pad-engaging force for all positions of a measuring arm.

Yet another object of the invention is to provide a new and improved hydraulic drive system for operating the pad arms in borehole measuring apparatus.

These and other objects of the invention are attained by mounting a single extensible arm on the borehole apparatus and including a swivel joint between the apparatus housing and a support cable so that the housing is maintained in contact with the lower side of a slanted borehole and the arm engages the higher side. Within the housing is a movable spring-biased collar linked to operate the measuring arm. A sealed hydraulic cylinder encloses a piston and a pump within the cylinder is arranged to force hydraulic fluid from one side of the piston to the other, driving the piston in the direction to compress the bias spring. In one embodiment of the invention the spring-biased collar is connected through a sector plate and a pivoted link to a crank arm extending inwardly from the pad arm. The link is connected to the sector plate and to the crank arm so that a high force is transmitted from the sector plate to the arm when the pad arm is extended and a low force is transmitted when the pad arm is retracted. Another form of the invention utilizes a linkage providing a linear relation between the spring-biased collar motion and the pad extension.

Further objects and advantages of the invention will be apparent from the reading of the following description in conjunction with the accompanying drawings in which:

FIG. 5 is a view in longitudinal section showing another form of arm-extending linkage;

FIG. 6 is a cross-sectional view taken on the lines 6—6 of FIG. 5 and looking in the direction of the arrows;

FIG. 7 is a view in longitudinal section showing a modification of the arm-extending linkage illustrated in FIG. 5;

FIG. 8 is a cross-sectional view taken on the lines 8—8 of FIG. 7 and looking in the direction of the arrows; and FIG. 9 is a view in longitudinal section of the upper portion of the borehole apparatus illustrating a swivel head connecting the borehole apparatus to a cable leading to the surface of the earth.

Figures 1, 2, 3, 4:
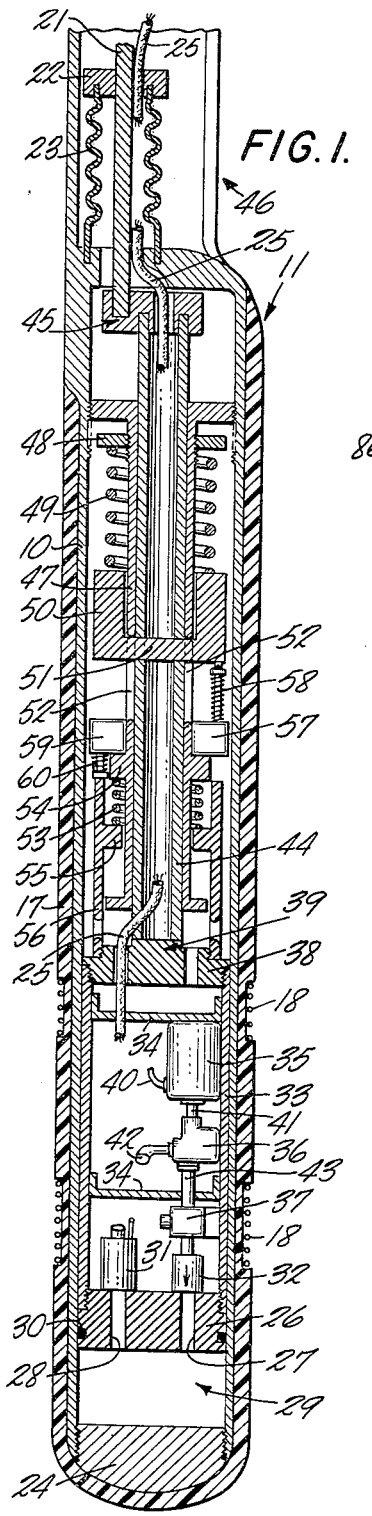
FIG. 1 is a view in longitudinal section through the lower portion of a representative borehole measuring apparatus arranged according to the invention, illustrating the hydraulic drive system.
FIG. 2 is a view in longitudinal section through the central portion of the borehole apparatus showing one form of measuring arm-extending linkage.
FIG. 3 is a cross-sectional view taken on lines 3—3 of FIG. 2 and looking in the direction of the arrows.
FIG. 4 is a cross-sectional view taken on lines 4—4 of FIG. 2 and looking in the direction of the arrows.

Generally, a typical single arm borehole apparatus arranged according to the invention comprises a tubular housing 10 enclosing arm extending and retracting drive equipment in a lower portion 11, shown in FIG. 1, and supporting an extensible pad assembly 12 in a central portion 13, as illustrated in FIG. 2. As best seen in FIG. 9, the housing 10 is supported in a well borehole from the surface of the earth by a conventional support cable 14 carrying electrical conductors 15 and connected to the housing 10 through a swivel head 16. It will be understood that the portion of the apparatus illustrated in FIG. 9 is joined to the top of the central portion 13, shown in FIG. 2, while the lower portion 11, illustrated in FIG. 1, extends from the bottom of the central portion 13.

The portion of the housing 10 at the lower end of the apparatus, shown in FIG. 1, is surrounded by an insulating layer 17 wherein electrodes 18 may be mounted for making various electrical tests to determine the character of the adjacent formation material. Also, a pad 19 of the usual type is mounted on the extensible assembly 12 (FIG. 2) and may include similar electrodes if desired, the various electrodes all being connected to the surface of the earth through some of the conductors 15 and suitable electrical wiring in the housing 10 which is not illustrated since it forms no part of the present invention.

Inasmuch as the housing 10 is joined to the cable 14 by the swivel head 16 it can readily assume any orientation within a borehole without being influenced by twisting of the cable. Thus, when the pad assembly 12 is extended to a position 20, shown in dotted lines in FIG. 2, as the sonde apparatus is raised through a slanted borehole, the housing 10, being substantially heavier than the assembly 12 and its pad 19, seeks the lowest position and rotates in the swivel so that it lies against the lower side of the borehole while the pad 19 engages the upper side. In this manner firm contact is maintained against diametrically opposed sides of the borehole wall and accurate borehole diameter measurements are obtained.

As described in greater detail hereinafter, in order to retract the pad assembly 12 a drawbar 21 is moved upwardly within the housing 10 to assume the position shown in FIGS. 1 and 2, downward motion of the drawbar being effective to extend the pad arm outwardly. As illustrated in FIG. 1, the drawbar 21 is fixed to a plug member 22 which is joined to the housing 10 through a fluid-tight flexible bellows 23, thereby sealing off the lower portion 11 of the housing while permitting longitudinal motion of the drawbar 21, the bottom end of the housing 10 being sealed by a nose piece 24. Thus, a sealed cylinder is formed by the nose piece 24, the housing 10, the bellows 23 and the plug 22 and, inasmuch as this cylinder is adapted to be filled with a relatively incompressible hydraulic fluid, its volume remains relatively constant with respect to the variations in external pressure encountered while passing through well boreholes so that the arm-extending operation described hereinafter is not affected by such variations due to the ability of the bellows to adjust for small volume changes. In order to transmit electrical signals to and from apparatus mounted within this cylinder which is described hereinafter, an electrical cable 25 passes through the plug 22, the conductors in this cable being electrically connected through certain of the conductors 15 to the surface of the earth.

At the lower end of the housing 10 a ported piston 26 includes two passages 27 and 28 and, in the upward position of the drawbar 21, this piston is spaced from the nose piece 24 to form a chamber 29. In order to form a fluid tight seal with the inner wall of the housing 10, the piston includes a gasket 30. The passage 28 leads from the chamber 29 through a normally closed solenoid valve 31 opening into the portion of the cylinder above the piston while the passage 27 is joined to a check valve 32 arranged to permit fluid to flow through the passage toward the chamber 29 and to block any flow of fluid through the passage away from the chamber. Extending upwardly from the piston 26 a split tube 33, held together by cross pieces 34, carries an electric motor 35, a pump 36, and a relief valve 37 and terminates at the upper end in a ported mandrel 38 having a central stub end 39.

When the motor 35 is operated by energization of its conductors 40 through the cable 25, the pump 36 is driven by a drive shaft 41 to draw in fluid through a filtered intake 42 above the piston 26 and transmit it through a conduit 43, the relief valve 37, the check valve 32 and the passage 27 into the chamber 29 below the piston. With the solenoid valve 31 closed, this increases the pressure in the chamber 29, driving the piston 26, the split tube 33 and the mandrel 38 upwardly within the housing 10. Actuation of the solenoid valve 31, on the other hand, opens the passage 28 to let fluid flow out of the chamber 29 and permit the piston 26 to be driven downwardly in the manner described below.

Normally abutting the stub end 39 of the mandrel 38, a tubular shaft 44 enclosing the cable 25 is connected at its upper end to the drawbar 21 by an offset member 45, the central portion 13 of the housing 10 having a recess 46 at one side to receive the retracted pad arm 12. Another tube 47 which surrounds the tubular shaft 44 is affixed to the housing 10 and carries an adjusting collar 48 supporting one end of a compression spring 49 while a second collar 50 receiving the other end of the spring 49 is affixed to the tubular shaft 44 by an integral portion 51 of the collar which passes through two longitudinal slots 52 in the tube 47. In this manner the shaft 44 and the drawbar 21 are normally urged downwardly within the housing 10 from their uppermost position illustrated in FIGS. 1 and 2 by the compression spring 49, thereby tending to extend the pad assembly 12.

At the same time, the mandrel 38, the split tube 33 and the piston 26 are also urged downwardly by another compression spring 53 positioned between a flange 54 on the tube 47 and a collar 55 on a tubular member 56 which is affixed to and extends upwardly from the mandrel 38. Thus, even though the extension of the pad assembly 12 may be limited by engagement of the borehole wall when the valve 31 is opened to lower the piston 26, thereby preventing the drawbar 21 and the tubular shaft 44 from being driven to their lowermost position in the housing by the spring 49, the spring 53 drives the mandrel 38, the split tube 33 and the piston 26 downwardly to their lowermost position, separating the stub end 39 of the mandrel from the bottom of the tubular shaft 44. Therefore, the tubular shaft 44 is free to move downwardly, after the solenoid valve 31 has been closed, permitting the pad assembly 12 to be extended farther when larger borehole diameters are encountered.

In order to detect the longitudinal position of the tubular shft 44 with respect to the housing 10 and, therefore, indicate the extension of the pad assembly 12 and the diameter of the borehole, a conventional potentiometer 57 is mounted on the tube 47 and has a spring-biased actuating arm 58 engaging the bottom of the collar 50. Similarly, another potentiometer 59 is supported on the tube 47 and has a spring-biased actuating arm 60 contacting the upper end of the tubular member 56 to indicate the position of the piston 26 with respect to the housing 10, each of these potentiometers being electrically connected through the cables 25 and 14 to the surface of the earth.

In operation, the hydraulic drive portion of the apparatus, illustrated in FIG. 1, is actuated to drive the drawbar 21 upwardly by energizing the pump drive motor 35 through the cable 25 and the conductors 40. The resultant operation of the pump 36 forces hydraulic fluid through the conduit 43 and the passage 27 into the chamber 29 and, with the solenoid valve 31 closed, the displacement of the fluid from one side of the piston 26 to the other drives the piston upwardly in the housing 10. This upward motion is transmitted through the tube 33, the mandrel 38, and the tubular member 56 to compress the spring 53. At the same time, the central stub 39 of the mandrel drives the tubular shaft 44 and the collar 50 upwardly to compress the spring 49, also transmitting upward motion through the drawbar 21 to retract the pad assembly 12. After the pump motor 35 has been turned off, the check valve 32 maintains the piston 26 at its upward position to hold the pad assembly 12 in the retracted condition.

When the appartaus has been lowered into a borehole to conduct a survey, the drawbar 21 is moved downwardly to extend the pad 19 outwardly from the housing 10 against the wall of the borehole by energizing the solenoid 31 to allow fluid in the chamber 29 to pass upwardly through the piston 26 thereby permitting the spring 53 to drive the mandrel 38 and piston 26 to their lowermost positions. The tubular shaft 44 and the drawbar 21 are also driven downwardly by the spring 49 until the pad 19 engages the borehole wall. Thereafter, inasmuch as the mandrel 38 is at its lowest position and is separated from the lower end of the shaft 44, the motion of the shaft is not restricted and the spring 49 maintains a downward force on the shaft urging the assembly 12 outwardly so that the pad 19 is maintained against the wall of the borehole regardless of changes in diameter.

In order to transmit the force of the spring 49 to the pad assembly 12 so that the pad is urged against the borehole wall with substantially the same radial force at any borehole diameter, the drawbar 21 is connected to the pad assembly 12 by the linkage illustrated in FIGS. 2, 3 and 4 which compensates for the reduction in the spring force transmitted to the assembly 12 as the spring 49 expands. As shown in FIG. 2 the assembly 12 comprises two parallel arm members 61 and 62, each pivotally mounted at 63 and 64 between a pair of parallel plates 65 and 66 which, if desired, may be integral with the housing 10 as illustrated in the drawings. The arm member 61 is pivotally attached at its outer end to a pad support 67, while the arm member 62 carries a pivot 68 at its outer end which is movably mounted in a longitudinal slot 69 in the pad support 67 to permit the pad 19 to tilt and thereby conform more closely to the wall surface of boreholes having an irregular contour.

At its inner end the arm member 62 carries a crank arm 70 extending from the pivot 64 inwardly between the plates 65 and 66 toward the opposite side of the housing 10. A link 71 supported at one end on the crank arm 70 by a pivot 72 is also rotatably supported at its other end on a sector plate 73 by a pivot 74, the sector plate 73 being pivotally mounted between the plates 65 and 66 at a pivot point 75. In order to compensate for the reduction in force transmitted through the drawbar 21 as the spring 49 expands, the pivots 72 and 74 are located on the crank arm 70 and the sector plate 73 so that the link 71 extends substantially perpendicularly to the radius of the crank arm 70 from the pivot point 64 when the arm member 62 is extended and forms an obtuse angle with the radius of the sector plate 73 to the pivot point 74 when the arm member 62 is extended. With the arm member 62 retracted, the link 71 extends substantially perpendicularly to the radius of the sector plate 73 to the pivot point 74 and forms an obtuse angle with the radius of the crank arm 70. It will be apparent that, if a constant angular force is applied to the sector plate 73, this linkage transmits increasing angular force through the arm member 62 as it is rotated outwardly. This increase in force is sufficient to compensate for the increased torque resulting from the weight of the assembly 12 as the arm member 62 rotates outwardly, in addition to the reduction in force resulting from expansion of the spring 49. Thus, the linkage maintains a constant radial force urging the pad 19 against the borehole wall.

In order to turn the sector plate 73 with an angular force proportional to the linear force exerted by the spring 49 in response to motion of the drawbar 21, a cable 76, secured at both ends in the end 77 of the drawbar 21 passes along arcual grooves 78 cut in each side of the sector plate and around a notch 79 at the end of the grooves. Two spaced parallel bars 80 and 81, also affixed at one end to the end 77 of the drawbar 21, are supported at the other end by a rocking link 82 mounted on a pivot 83 between the plates 65 and 66. As best seen in FIG. 4, a recess 84 is cut into the sector plate 73 and a pin 85 extending across the recess receives a hooked arm 86. This arm extends through a collar 87 mounted in a pivot 88 between the two bars 80 and 81 to permit angular motion with respect to the bars, and a compression spring 89 is positioned between the collar and a washer 90 at the end of the hooked arm 86 to urge the arm and the sector plate 73 upwardly as viewed in the drawings and thereby maintain tension on the cable 76.

In operation, when the drawbar 21 is moved downwardly to retract the assembly 12, it pulls the cable 76 longitudinally, rotating the sector plate 73 with a force proportional to that exerted by the spring 49 at all angles since the cable approaches tangentially to the arcual grooves 78. With the arm member 62 in its retracted position, the link 71 is driven perpendicularly to the radius of the sector plate to the pivot point 74 and at an obtuse angle to the crank arm 70. As the angle between the sector plate 73 and the link 71 increases, greater force is applied through the link by the rotation of the sector plate and, as the angle between the link and the crank arm 70 decreases, extending the pad 19 while the spring 49 expands, this force is further increased so that substantially constant radial force is applied to the pad 19. When the drawbar 21 and the parallel bars 80 and 81 are driven upwardly in the housing 10 the sector plate 73 rotates in the opposite direction to retract the assembly 12, the cable 76 being held taut by the spring 89.

Although the linkage described above maintains a substantially constant radial pad force at all positions of the assembly 12, it does not provide a linear relation between the motion of the drawbar 21 and the radial extension of the pad 19 from the housing 10. Accordingly, the extension-indicating potentiometer 57 (FIG. 1) must be calibrated or the departure from linearity compensated electrically. If it is desired to obtain a direct reading from the potentiometer which is a substantially linear function of the arm extension, the linkage illustrated in FIGS. 5 and 6 may be utilized. In this embodiment, the two parallel bars 80 and 81, which are secured to the end 77 of the drawbar 21, carry a cross piece 91 slidably supported between two parallel plates 92 and 93 mounted between the side plates 65 and 66. In order to guide the sliding motion of the cross piece 91, a tongue 94 integral with the bars 80 and 81 extends into a longitudinal groove 95 in the plate 93. At a pivot point 96 on the cross piece 91 a link 97 is pivotally supported and extends diagonally across the inside of the housing to a pivotal connection 98 with another link 99 which is supported at its other end between the side plates 65 and 66 by a pivot 100. The link 99 is joined to the arm member 62 by a parallelogram arrangement wherein a pivot 101 supports the end of the link 71 on the link 99 at a distance from its center of rotation equal to the effective radius of the crank arm 70 and the length of the link 71 is made equal to the spacing between the crank arm pivot point 64 and the pivot 100 for the link 99.

In operation, downward motion of the drawbar 21 and the parallel plates 80 and 81 slides the cross piece 91 vertically between the plates 92 and 93, opening the parallelogram formed by the links 71 and 99 to extend the arm member 62. When the arm member is extended to a point within its normal operating range, the parallelogram is at approximately 45° so that a given vertical motion of the cross piece 91 produces a substantially proportional radial motion of the pad at the end of the arm member 62.

Inasmuch as the linkage arrangement described above is exposed to the drilling mud in boreholes into which the apparatus is lowered, the tongue 94 may in some instances tend to bind in the groove 95, impeding the sliding motion of the cross piece 91. If desired, therefore, the arrangement shown in FIGS. 7 and 8 may be substituted in the linkage of FIG. 6 to eliminate the sliding contact between the cross piece 91 and the plates 92 and 93.

As illustrated in FIGS. 7 and 8, the two bars 80 and 81 carry a forked member 101a which is pivotally joined to a triangular block 102 by a pin 103. The block 102 is supported by two identical links 104 and 105 pivotally mounted at one end between the plates 65 and 66 at pivot points 106 and 107 and joined to the triangular block 102 at the other end by two pivots 108 and 109 near the base of the triangle, respectively. Near the apex of the triangle a pivot 110 supports the upper end of the link 97 so that vertical motion of the bars 80 and 81 is applied to the link by the triangular block in the same manner as by the cross piece 91 in FIG. 6.

While the borehole apparatus is passing through a well borehole, the support cable 14, shown in FIG. 9, may twist, tending to rotate the housing through a large number of rotations. If the housing 10 were rotated while in a slanted borehole with the pad arm 12 extended to move the housing away from the lower side of the borehole, the weight of the housing would tend to retract the pad arm, giving an incorrect borehole diameter indication. Accordingly, the swivel head 16, illustrated in FIG. 9, is arranged to permit the cable 14 to turn freely through any number of rotations without displacing the housing 10 from the lowest side of a slanted borehole.

Formed at the upper end of the housing 10, a connecting portion 111 of smaller diameter than the housing terminates in a collector head 112 carrying a suitable number of peripheral slip rings 113 to which the conductors within the cable 25 are electrically connected. Surrounding the connecting portion 111 and rotatably mounted thereon by suitable bearings 114 is a tubular swivel body 115. The support cable 14 is secured in the usual manner to the upper end of the tubular body 115 while a liquid-tight seal with the housing 10 is provided at the lower end of the body 115 by a gasket 116. A collar 117 affixed to the inside of the body 115 carries suitable contacts 118 which are joined to the conductors 15 in the cable 14 and engage the slip rings 113, thereby connecting the electrical units in the housing 10 with the surface of the earth while permitting the housing to turn with respect to the support cable 14.

In order to equalize the extreme pressures encountered deep in well boreholes and prevent foreign matter from reaching the bearings 114 and the collector head 112, the swivel body 115 is filled with hydraulic fluid which is in communication with one side of a floating piston 119 while the other side of the piston is exposed to the borehole fluid pressure. The piston 119 is slidably supported on the outer surface of a tube 120 mounted within the body 115 and two gaskets 121 and 122 on the piston form a liquid-tight seal with the tube 120 and with the body 115, respectively. The annular chamber 123 thus formed between the tube 120 and the body 115 is opened to the borehole through ports 124 to apply the borehole fluid pressure to one side of the piston 119. On the other side of the piston, ports 125 in the tube 120 transmit the pressure of the bore-hole fluid to the hydraulic fluid filling the swivel body 115. In this manner, the internal and external pressures exerted on the body 115 are equalized to prevent binding so that the housing 10 is freely rotatable within the swivel head 16.

Although the invention has been described herein with reference to specific embodiments, many modifications and variations therein will readily occur to those skilled in the art. Accordingly, all such modifications and variations are included within the intended scope of the invention as defined by the following claims.

I claim:

1. Hydraulic drive apparatus adapted for use under variable external pressure conditions comprising sealed cylinder means including flexible bellows means, a shaft sealingly received by the bellows means and passing into the cylinder means, piston means movable within the cylinder means and linked to the shaft, and pump means for pumping hydraulic fluid from one side of the piston means to the other.

2. Hydraulic drive apparatus adapted for use under variable external pressure conditions comprising sealed cylinder means including flexible bellows means, a drive shaft sealingly received by the bellows means and passing into the cylinder means, piston means movable within the cylinder means and linked to the shaft, pump means within the cylinder means for pumping hydraulic fluid from one side of the piston means to the other, and valve means operable to permit hydraulic fluid to flow from the other side of the piston means toward the pump means.

3. Hydraulic drive apparatus adapted for use under variable external pressure conditions comprising sealed cylinder means including flexible bellows means, a drive shaft sealingly received by the bellows means and passing into the cylinder means, piston means movable in the cylinder means and linked to the drive shaft having at least one passage, pump means within the cylinder means for pumping hydraulic fluid through the passage from one side of the piston to the other, check valve means preventing fluid from flowing through the pump means in the opposite direction, and valve means operable to permit hydraulic fluid to flow from the other side of the piston means toward the pump means.

4. Hydraulic drive apparatus adapted for use under variable external pressure conditions comprising sealed cylinder means including flexible bellows means, a drive shaft sealingly received by the bellows means and passing into the cylinder means, piston means movable within the cylinder means forming a chamber at one end of the cylinder means and linked to the drive shaft, spring means normally urging the piston means in the direction to reduce the volume of the chamber, and pump means within the cylinder means for pumping hydraulic fluid into the chamber to urge the piston means in the opposite direction.

5. Hydraulic drive apparatus adapted for use under variable external pressure conditions comprising sealed cylinder means including flexible bellows means, a drive shaft sealingly received by the bellows means and passing into the cylinder means, piston means movable within the cylinder means forming a chamber at one end of the cylinder means and having an end portion abutting the drive shaft, spring means normally urging the drive shaft against the piston means in the direction to reduce the volume of the chamber, and pump means within the cylinder means for pumping hydraulic fluid into the chamber to urge the piston means in the opposite direction.

6. Hydraulic drive apparatus adapted for use under variable external pressure conditions comprising sealed cylinder means including flexible bellows means, a drive shaft sealingly received by the bellows means and passing into the cylinder means, piston means movable within the cylinder means forming a chamber at one end of the cylinder means and having an end portion abutting the drive shaft, first spring means normally urging the drive shaft against the piston means in the direction to reduce the volume of the chamber, second spring means urging the piston means in the same direction, and pump means for pumping hydraulic fluid into the chamber to urge the piston means in the opposite direction.

7. Apparatus for measuring borehole diameters comprising a housing, sealed cylinder means within the housing including flexible bellows means, a drive shaft sealingly received by the bellows means and passing into the cylinder means, piston means movable within the cylinder means and linked to the drive shaft, pump means for pumping hydraulic fluid from one side of the piston means to the other to urge the piston means in one direction, spring means normally urging the piston means in the opposite direction, and measuring means laterally extensible and retractable with respect to the housing in response to motion of the drive shaft.

8. Apparatus for measuring borehole diameters comprising a housing, sealed cylinder means within the housing including flexible bellows means, a drive shaft sealingly received by the bellows means and passing into the cylinder means, piston means movable within the cylinder means and linked to the drive shaft, pump means for pumping hydraulic fluid from one side of the piston means to the other to urge the piston means in one direction, spring means normally urging the piston means in the opposite direction, measuring means laterally extensible and retractable with respect to the housing in response to motion of the drive shaft, and electrical means for indicating the extension of the measuring means.

9. Apparatus for measuring borehole diameters comprising a housing, sealed cylinder means within the housing including flexible bellows means, a drive shaft sealingly received by the bellows means and passing into the cylinder means, piston means movable within the cylinder means forming a chamber at one end of the cylinder means and having an end portion abutting the drive shaft, first spring means normally urging the drive shaft against the piston means in the direction to reduce the volume of the chamber, second spring means urging the piston means in the same direction, pump means for pumping hydraulic fluid into the chamber to urge the piston means in the opposite direction, measuring means laterally extensible and retractable with respect to the housing in response to motion of the drive shaft, first electrical means for indicating the extension of the measuring means, and second electrical means for indicating the position of the piston means.

10. Apparatus for measuring the diameter of a slanted borehole comprising a housing having one side adapted to rest against the lower borehole wall, measuring arm means mounted only on the opposite side of the housing extensible to engage the upper wall of the borehole, support cable means for moving the housing through the borehole, and swivel means rotatably connecting the housing with the support cable means permitting the housing to remain against the lower side of the slanted borehole and the measuring arm means to engage the higher side when the cable means is rotated.

11. Apparatus for measuring the diameter of a slanted borehole comprising a housing, measuring arm means mounted on the housing extensible to engage the wall of the borehole, support cable means for moving the housing through the borehole, swivel means rotatably connecting the housing with the support cable means permitting the housing to remain against the lower side of the slanted borehole and the measuring arm means to engage the higher side when the cable means is rotated, and floating piston means within the swivel means having one side exposed to the borehole to equalize the pressures exerted on the swivel means.

12. Apparatus for measuring the diameter of a slanted borehole comprising a housing, measuring arm means mounted on the housing extensible to engage the wall of the borehole, support cable means for moving the housing through the borehole, swivel means rotatably connecting the housing with the support cable means permitting the housing to remain against the lower side of the slanted borehole and the measuring arm means to engage the higher side when the cable means is rotated, sealed cylinder means including flexible bellows means, a drive shaft sealingly received by the bellows means and passing into the cylinder means, piston means movable within the cylinder means and linked to the drive shaft, pump means for pumping hydraulic fluid from one side of the piston means to the other, and linkage means for extending and retracting the measuring arm means in response to motion of the drive shaft.

13. Apparatus for measuring borehole diameters comprising a housing, measuring arm means pivotally mounted on the housing adapted to engage the borehole wall at its outer end, sector plate means pivotally mounted in the housing and linked to the measuring arm means, cable means tangentially approaching the sector plate means to turn it in response to lengthwise motion of the cable means, and drive means for transmitting lengthwise motion to the cable means to pivot the measuring arm means.

14. Apparatus for measuring borehole diameters comprising a housing, measuring arm means pivotally mounted on the housing adapted to engage the borehole wall at its outer end, sector plate means pivotally mounted in the housing, linked to the measuring arm means and having an arcuate groove, cable means passing through the arcual groove and approaching the sector plate means tangentially to turn it in response to lengthwise motion of the cable means, and drive means for transmitting lengthwise motion to the cable means to pivot the measuring arm means.

15. Apparatus for measuring borehole diameters comprising a housing, measuring arm means pivotally mounted on the housing adapted to engage the borehole wall at its outer end, sector plate means pivotally mounted in the housing and having an arcual groove, cable means passing through the arcual groove and approaching the sector plate means tangentially to turn it in response to lengthwise motion of the cable means, drive means for transmitting lengthwise motion to the cable means, crank arm means connected to the measuring arm means, and link means pivotally connected to the sector plate means and to the crank arm means forming an obtuse angle with the sector plate means and substantially a right angle with the crank arm means when the measuring arm means is extended and forming substantially a right angle with the sector plate means and an obtuse angle with the crank arm means when the measuring arm means is retracted.

16. Apparatus for measuring slanted borehole diameters comprising a housing having one side adapted to rest against the lower borehole wall, measuring arm means pivotally mounted only on the opposite side of the housing adapted to engage the upper borehole wall at its outer end, crank arm means connected to the measuring arm means, a drive shaft movable within the housing, and link means connecting the crank arm means with the drive shaft to move the outer end of the measuring arm means toward the borehole wall in substantially linear relation to the motion of the drive shaft.

17. Apparatus according to claim 16 including a member slidably supported in the housing and connected to the drive shaft, and pivot means connecting the link means to the member.

18. Apparatus according to claim 16 including a member connected to the drive shaft and supported from the housing for motion substantially parallel to the drive shaft by identical links forming a parallelogram, and pivot means connecting the link means to the member.

References Cited in the file of this patent

UNITED STATES PATENTS

| | | |
|---|---|---|
| 1,905,200 | Williams | Apr. 25, 1933 |
| 2,795,856 | Reesby et al. | June 18, 1957 |
| 2,812,587 | Roussin | Nov. 12, 1957 |
| 2,855,685 | Barreteau | Oct. 14, 1958 |
| 2,876,413 | Saurenman et al. | Mar. 3, 1959 |